Patented Sept. 6, 1938

2,128,966

UNITED STATES PATENT OFFICE 2,128,966

COATED ABRASIVE ARTICLE AND METHOD OF MAKING THE SAME

Norman Pierce Robie, Niagara Falls, N. Y., assignor, by mesne assignments, to The Carborundum Company, Niagara Falls, N. Y., a corporation of Delaware No Drawing. Application February 7, 1935, Serial No. 5,404

4 Claims. (Cl. 51—278)

This invention relates to an improvement in coated abrasive articles and a method of making the same. More particularly the invention is concerned with a method of making a coated abrasive such as sandpaper wherein an adhesive is applied in pulverized condition to the backing.

It has previously been proposed to manufacture coated abrasives by applying a liquid phenolic condensation product to a backing and sprinkling on abrasive grains in the manner usual to the manufacture of ordinary sandpaper where glue is used as the adhesive. It has also been suggested that abrasive grain be mixed with a liquid phenolic condensation product resin and the mixture be applied to the backing.

Methods which employ a resin in liquid condition are open to a number of objections. For example, the resins tend to soak into the paper or cloth backing and thereby both starve the grain of bond and render the backing more or less brittle. Certain resins also appear to weaken paper to a considerable extent when the coated product is heated to cure the binder. My method avoids these difficulties.

Furthermore, the conventional methods of making abrasive coated products as above described requires that a second or sizing coating of adhesive be employed in order to assure sufficient binder to attach the grains firmly to the backing. Certain embodiments of my invention eliminate the sizing step.

My process also makes a product which is sharper than can ordinarily be obtained where conventional methods of manufacture are used. At the same time, the abrasive grains, in articles made by my process, are rigidly attached to the backing and sharpness is not obtained at the sacrifice of firmness of binding.

In the broader sense, my process comprises the steps of applying a mixture of abrasive grains and a pulverized binder to a backing which has been treated so as to cause the mixture of grain and binder to become attached to the backing, and then treating the coated product to cause the binder in the mixture to adhere to both the grains and the backing. Where a heat hardenable resin, such as a phenolic condensation product, is used as the adhesive or binder, my process may comprise the additional step of heating the coated product to heat harden the resin binder.

The backing may be treated in one or more of a number of ways to cause the mixture of grain and resin to adhere to it. For example, the backing may be preliminarily coated with a surface layer of a resin solvent which will partially dissolve the resin and cause it to become sufficiently adhesive to stick to the backing. I have sometimes found it desirable to use a reactive solvent for this purpose, particularly where the binder is a heat-reactive resin, as this combination appears to cause exceptionally good adhesion of the binder to the backing.

A second method of attaching the mixture of grain and binder to the backing comprises heating the backing to a temperature sufficient to soften the parts of the resin immediately in contact with it and thus cause the resin to stick to the backing. Where this method is employed it is frequently desirable to apply a sizing coat of binder.

The step of treating the coated backing to cause the binder to adhere to the grains and to the backing may be a heat treatment to soften the binder and cause it to become adhesive or alternatively the binder may be rendered adhesive by treating it with a solvent for the binder. Obviously a combination of the two methods may be employed.

I will now illustrate my invention with a number of specific examples, it being understood that the examples are illustrative only and not limitative.

Example I

One side of a sheet of paper of a type commonly employed in the manufacture of sandpaper and known as "130 pound cylinder stock" is moistened with furfural and a mixture of 90 parts by weight of No. 120 grit fused alumina with 10 parts by weight of a pulverized phenolic condensation product in the so-called "A stage" is sprinkled over the moistened surface. The excess grain and resin may be removed from the coated surface by turning the paper with the coated side down and the product is then heated in an oven for 45 minutes at 300° F. to first soften and then heat-harden the resin.

Example II

A sheet of 130 pound cylinder stock paper is heated for five minutes in an oven in which the temperature is 350° F. A mixture of 80 parts by weight of 120 grit fused alumina with 20 parts by weight of finely pulverized A stage phenolformaldehyde resin is sifted onto the paper and after the resin has been given a chance to soften from heat the excess of resin and grain is removed. The coated paper is then heated to heat-harden the resin binder.

As has been previously pointed out, my invention has a number of advantages over the practices of the prior art, not only as to method but as to the product obtained. The method is easily carried out, it does not involve a penetration of the backing by the adhesive with the consequent undesirable results, and it requires a much shorter heat treatment than is needed where a normally liquid resin is employed as the adhesive or binder because the normally solid resins are farther advanced toward the infusible and insoluble condition than are the normally liquid products heretofore employed.

I have observed that abrasive coated products made by my process appear to be unusually sharp and rough, a condition which is particularly noticeable in fine grits. While I do not wish to be bound as to the accuracy of any theories, my explanation of this observed condition is that the pulverized resin settles between the grains and binds them firmly to the backing at the bases of the grains, leaving the parts of the grains which are at the outer surface of the product uncoated in contrast to sandpaper made by previously known methods where the sizing coating tends to stick to the sides and even to the tops of the grains rather than to concentrate at the bases.

My invention is adapted to a number of variations such as the proportion of resin to grain, the kind of adhesive, kind and size of grain and the like. For example, other types of binder than those exemplified can be employed such as permanently fusible resins like metastyrene or polymerized vinyl compounds. In fact any suitable material which can be pulverized and which will either soften under temperatures low enough not to destroy the backing or which is soluble in some suitable solvent can be employed.

It is also within the scope of my invention to modify the property of the binder by the use of suitable addition agents. These may be pulverized products, which can be conveniently incorporated with the resin or with the mixture of resin and grain, or I may employ liquids which may be incorporated with the solvent or may be used instead of the solvent sometimes applied to the backing to cause the resin to adhere to the backing preliminary to the step of heating. For example, I have successfully incorporated pulverized flint with the resin in order to strengthen and extend it and I have also incorporated tricresyl phosphate with furfural to wet the backing before the resin-grain mixture was spread over the backing.

Furthermore, while my invention finds its greatest use in the manufacture of articles such as sandpaper, it is well adapted to the making of other coated products such as abrasive disks, files and the like.

Other modifications and embodiments may be practiced within the spirit of my invention, the scope of which is defined by the appended claims.

I claim:

1. The method of making abrasive coated products which comprises preparing a dry liquid-free mixture comprising abrasive grains and a powdered binder which is soluble in common organic solvents and softenable by heat, moistening the backing with a solvent for the binder to cause the mixture of grain and binder to adhere to the backing, coating the backing with the mixture, and heating the thus coated backing to cause the binder to adhere to both the grains and the backing.

2. The method of making abrasive coated products which comprises preparing a dry liquid-free mixture comprising abrasive grains and a powdered heat-reactive binder, moistening a backing with a liquid which is a solvent for the binder and which reacts with the binder under the application of heat, coating the backing with the mixture of grain and binder, and heating the thus coated backing to cause the binder and the liquid to react and harden.

3. The method of making abrasive coated products which comprises preparing a dry liquid-free mixture comprising abrasive grains and a powdered heat-reactive phenolic resin, moistening a backing with a liquid which is a solvent for the binder and which reacts with the binder under the application of heat, coating the backing with the mixture of grain and resin and heating the thus coated backing to cause the binder and the liquid to react and harden.

4. The method of making abrasive coated products which comprises preparing a dry liquid-free mixture comprising abrasive grains and a powdered binder which is adapted to be made adhesive by treatment with a solvent, separately treating a backing material to cause the mixture to adhere directly to it when the binder comes in contact with the backing, applying the mixture of grain and binder to the treated backing, applying a solvent to the binder to cause it to become adhesive, and then treating the thus-formed article to harden the binder and thus fix the grains on the backing.

NORMAN PIERCE ROBIE.